F. C. SCOTT.
Horse Collar.
No. 228,945.
Patented June 15, 1880.
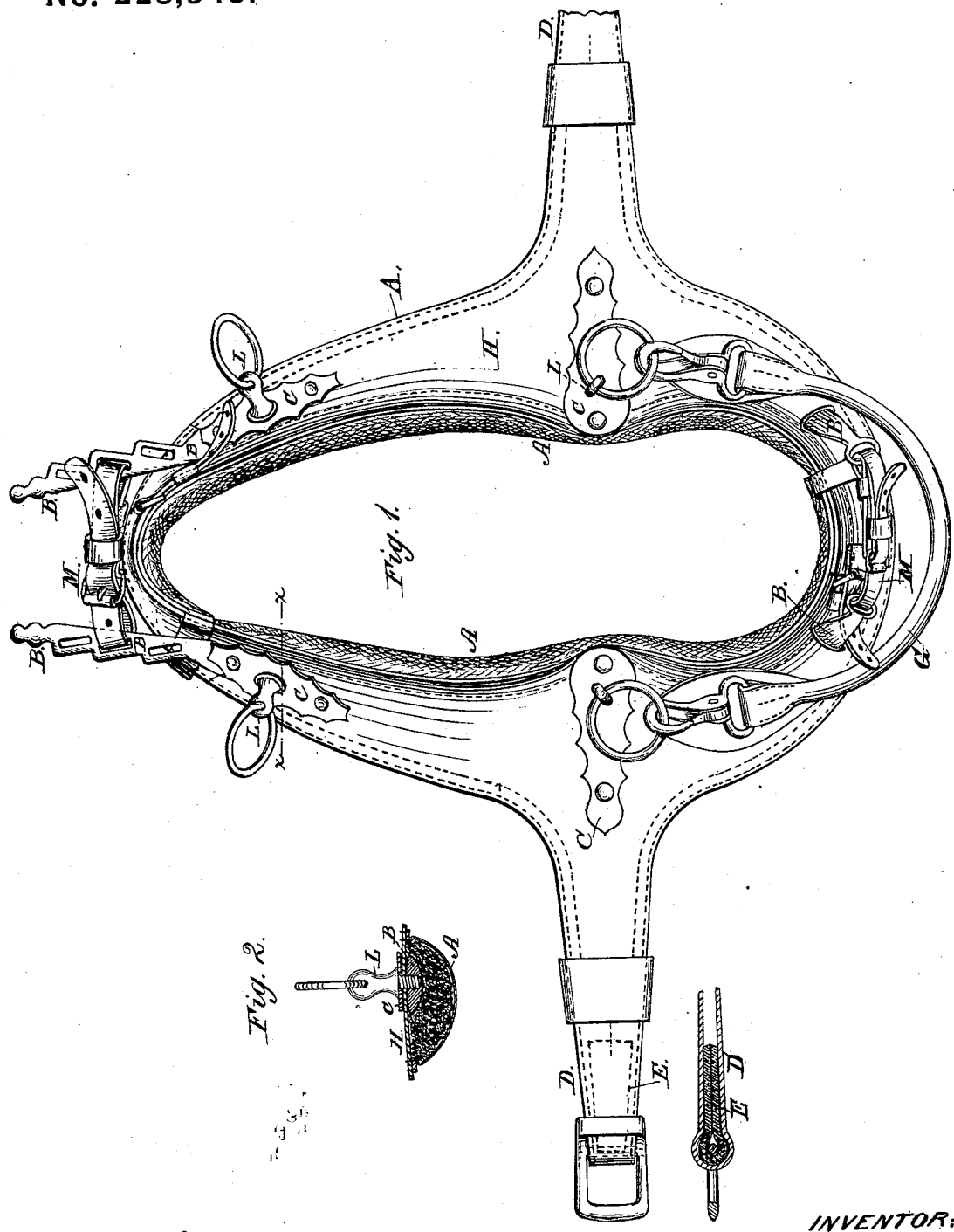
WITNESSES:
E. R. Williams.
O. E. Duffy
INVENTOR:
F. C. Scott

UNITED STATES PATENT OFFICE.

FLETCHER C. SCOTT, OF FINCASTLE, VIRGINIA.

HORSE-COLLAR.

SPECIFICATION forming part of Letters Patent No. 228,945, dated June 15, 1880.

Application filed May 16, 1879.

*To all whom it may concern:*

Be it known that I, F. C. SCOTT, of Fincastle, in the county of Botetourt and State of Virginia, have invented a new and Improved Horse-Collar; and I do hereby declare that the following is a full, clear, and exact description of the same.

My invention is an improvement in the class of horse-collars in which the hames and collar proper are permanently attached to each other. I form the collar proper of a soft stuffed inner portion and an outer leather plate, which is comparatively stiff and forms the ornamental face of the collar, and also covers and protects said inner part. The collar is divided at top and bottom, and to each of the two parts thus formed I attach an iron hame, the same being inserted and secured between the outer covering-plate and the inner or stuffed portion.
Both the hames and the parts of the divided collar proper are connected at top and bottom by means of straps, so that they may be adjusted together to adapt the collar as a whole to necks of animals of different sizes.
In the accompanying drawings, Figure 1 is a front view of the collar complete, the hame or tug straps being shown extended laterally. Fig. 2 is a cross-section on line $x\ x$, Fig. 1.

A indicates the inner or soft stuffed portion of the collar proper, and H the outer or front portion thereof, which is a broad stiff leather plate having the straps D, for attachment of the tugs or traces. The iron hames B are attached to the collar proper, A, as shown—that is to say, by slitting the leather plate H transversely near top and bottom and inserting the hames through the slits so that their ends project, while the body or main portion lies beneath and is concealed by the plate H, to which it is permanently attached by means of the screw-studs L, carrying the rein and pole-strap rings. The said studs also pass through thin metal plates C, applied to the face of the leather plate H.

The collar proper, A, is divided at top and bottom, and the two parts thereof are lapped and connected by buckle-straps. The hames B B are likewise connected by buckle-straps, so that both the collar proper and hames may be adjusted together to adapt the collar as a whole to the necks of larger or smaller horses.

The feature of permanent connection of the hames with the soft portion of the collar and the adaptation for adjustment are very important in practical use, since the collar may be easily and quickly fitted to animals of varying sizes and the same relation of its main parts preserved.

In the looped ends of the hame tugs or straps D, I place a piece of rubber, E, whose elasticity partly relieves the shoulders of the animal on which the collar is used of the jars or sudden shocks incident to draft.

What I claim is—

The improved collar formed of the soft inner portion, A, the leather front or protecting plate, H, having straps D, and the hames arranged beneath the front plate, and the studs L, which secure the hames permanently to the latter, said hames and the collar proper, H A, being connected adjustably by straps, as shown and described, for the purpose specified.

FLETCHER CLAIBORN SCOTT.

Witnesses:
B. M. ALLEN,
T. H. ALLEN.